United States Patent [19]

Kimura et al.

[11] Patent Number: 5,471,579
[45] Date of Patent: Nov. 28, 1995

[54] GRAPHICS SYSTEM USING PARALLEL PROCESSORS AND PROCESSING METHOD OF THE SAME

[75] Inventors: Shinji Kimura, Sagamihara; Yumiko Sugita, Musashino; Shouji Nakamura, Yokohama; Eriko Koda, Machida, all of Japan

[73] Assignee: Hitachi, Ltd., Tokyo, Japan

[21] Appl. No.: 147,982

[22] Filed: Nov. 5, 1993

[30] Foreign Application Priority Data

Nov. 10, 1992 [JP] Japan ................................ 4-299550

[51] Int. Cl.$^6$ .................................................. G06F 15/16
[52] U.S. Cl. ............................................................ 395/163
[58] Field of Search .................................. 395/162–164, 395/325, 650, 157, 120; 364/228, 931.4, 931.41, 229, 229.2

[56] References Cited

U.S. PATENT DOCUMENTS 4,649,498  3/1987  Kedem et al. ........................ 395/120

FOREIGN PATENT DOCUMENTS 2-275581  of 0000  Japan .
2-150973  of 0000  Japan .

OTHER PUBLICATIONS

Kirk, David, et al. "The Rendering Architecture of the DN10000VS," Computer Graphics, vol. 24, No. 4, Aug. 1990, pp. 299–307. (English).

Parallel Processing Symposium JSPP, 1992, pp. 375–382. (Abstract provided in English).

Primary Examiner—Mark R. Powell
Assistant Examiner—Kee M. Tung
Attorney, Agent, or Firm—Fay, Sharpe, Beall, Fagan, Minnich & McKee

[57] ABSTRACT

A graphics system using a part or the entire part of a plurality of general-purpose processors which can be processed in parallel for output processing which classifies a series of graphics output primitives which are sent to the graphics program from the application program into graphics output primitives which can be operated in parallel and graphics output primitives which cannot be operated in parallel, obtains the frequency of occurrences of graphics output primitives which cannot be operated in parallel among them, and automatically determines the number of processors to be allocated to the graphics program from this frequency of occurrences.

15 Claims, 12 Drawing Sheets

GRAPHICS SYSTEM USING PARALLEL PROCESSORS AND PROCESSING METHOD OF THE SAME

BACKGROUND OF THE INVENTION

The present invention relates to a parallel processor having a plurality of processors which can be executed in parallel and more particularly to a graphics system requiring smooth regeneration display like an animation.

Application fields of computer graphics have spread to visual simulation and visualization of scientific and technological calculation results and there are more increasing requests for improved high-speed drawing for display performance.

The conventional technique in response to such a request for high-speed drawing is to perform geometry data processing such as coordinate transformation and clipping by dedicated processors. Particularly in the fields requiring high-speed performance, as indicated in Japanese Patent Application Laid-Open No. 2-275581, a method is disclosed so that a dedicated processor for performing the geometry data processing comprises a plurality of processors and the individual processors are connected in a pipeline state is known. A method for performing the geometry data processing in parallel is indicated in Computer Graphics, Vol. 24, No. 4, pp 299 to 307 and Japanese Patent Application Laid-Open No. 2-150973. A thesis on a realization system of geometry data processing on a multi-processor is recently reported in Parallel Processing Symposium JSPP, 1992, pp 375 to 382.

SUMMARY OF THE INVENTION

The aforementioned high-speed system is realized by a dedicated processor or dedicated graphics processing hardware and it is often used together with a general-purpose processor which is generally operated by an operating system or application program. Therefore, a computer equipped with a general-purpose processor and dedicated graphics hardware increases in the number of hardware units and the cost goes up. In an apparatus using parallel processing in the dedicated graphics hardware, specific processing such as geometry data processing is fixedly allocated to each processor, so that it often uses a structure so that no load can be changed dynamically.

There are two types of output processing available such as output processing which allows parallel processing of line drawing and polygon drawing and output processing (attribute processing) which does not allow parallel processing of changing of a coordinate transformation value for changing the status which is referred to by each processor.

Therefore, when output processing is executed by a plurality of processors in parallel, the processors synchronize with each other in execution of the attribute processing, so that it requires a lot of time and the effect of parallel execution decreases. Particularly when output processing is realized in parallel in an apparatus having a plurality of general-purpose processors, each processor is placed in the wait state during the synchronous processing for the aforementioned attribute processing and the time for executing the processing of the operating system or application program is required, so that the performance of the entire system is decreased.

To solve this problem, the above thesis proposes a method for eliminating the synchronous processing by allowing all the processors to execute an attribute primitive. However, the thesis describes that a new problem that the traffic of the bus between the memory and each processor increases because the attribute primitive is transferred to all the processors according to this method is imposed.

The above problem not only relates to parallel processing of graphics output primitives but also exists in a parallel processor in which primitives are executed by a plurality of processors in parallel.

An object of the present invention is to provide a graphics system for speeding up the processing without the operating rate of the entire system being decreased.

Another object of the present invention is to provide a parallel processor in which primitives are always executed in parallel by an appropriate number of general-purpose processors among a plurality of general-purpose processors.

The graphics system of the present invention is characterized in that the system has a means to classify graphics output primitives according to characteristics thereof, for example, primitives which can be executed in parallel and primitives which cannot be executed in parallel, a means to obtain the frequency of occurrences of graphics output primitives of each classified group among a group of graphics data (graphics output primitive groups) which is transferred for processing, and a means to determine the number of processors to be used for output processing from the obtained frequency of occurrences. For example, when the frequency of occurrences of attribute primitives which cannot be executed in parallel is high, only one processor is allocated to the output processing and when the frequency of occurrences of attribute primitives which cannot be executed in parallel is low, at least two processors are allocated to the output processing.

The graphics system of the present invention is also characterized in that the system has a means to obtain the frequency distribution of classified groups furthermore and determines the number of processors to be used for output processing from the above frequency of occurrences and the frequency distribution of groups. For example, when the frequency of occurrences of attribute primitives which cannot be executed in parallel is high but the rate of continuous occurrences of the attribute primitives which cannot be executed in parallel to independent occurrences thereof is high, at least two processors are allocated to the output processing.

The type (group), sequence, and frequency of occurrences of graphics output primitives which are generated from an application program are almost fixed depending on the type of the application program. Even if the point of view and the size of visual field for the display contents are changed (display changes on the display screen caused by rotation or position movement of a solid), the graphics data itself is changed little, so that the type (group), sequence, and frequency of occurrences are also changed little. Therefore, for example, graphics output primitives which are transferred to the buffer at a time for processing are classified as mentioned above, and the frequency of occurrences is calculated for each classification, and the number of processors to be used for output processing is determined, and the output processing can be performed by the processors whose number is determined for the graphics output primitives which are to be transferred to the buffer next time. As a result, graphics output primitives are processed in parallel by processors in an appropriate number, so that the overhead caused by the synchronous processing can be reduced or the processing capacity can be increased by the parallel processing. Even if the number of processors is determined from the frequency of occurrences for each classification before the point of time that a fixed number or a fixed rate of graphics output primitives which are generated from the same application program is executed and the output processing is performed by the processors in the number which is determined in the preprocess of the application program, almost the same effect can be obtained.

DETAILED DESCRIPTION OF THE PREFERRED EMBODIMENTS

Next, an embodiment of the present invention will be explained in detail.

Figure 2:
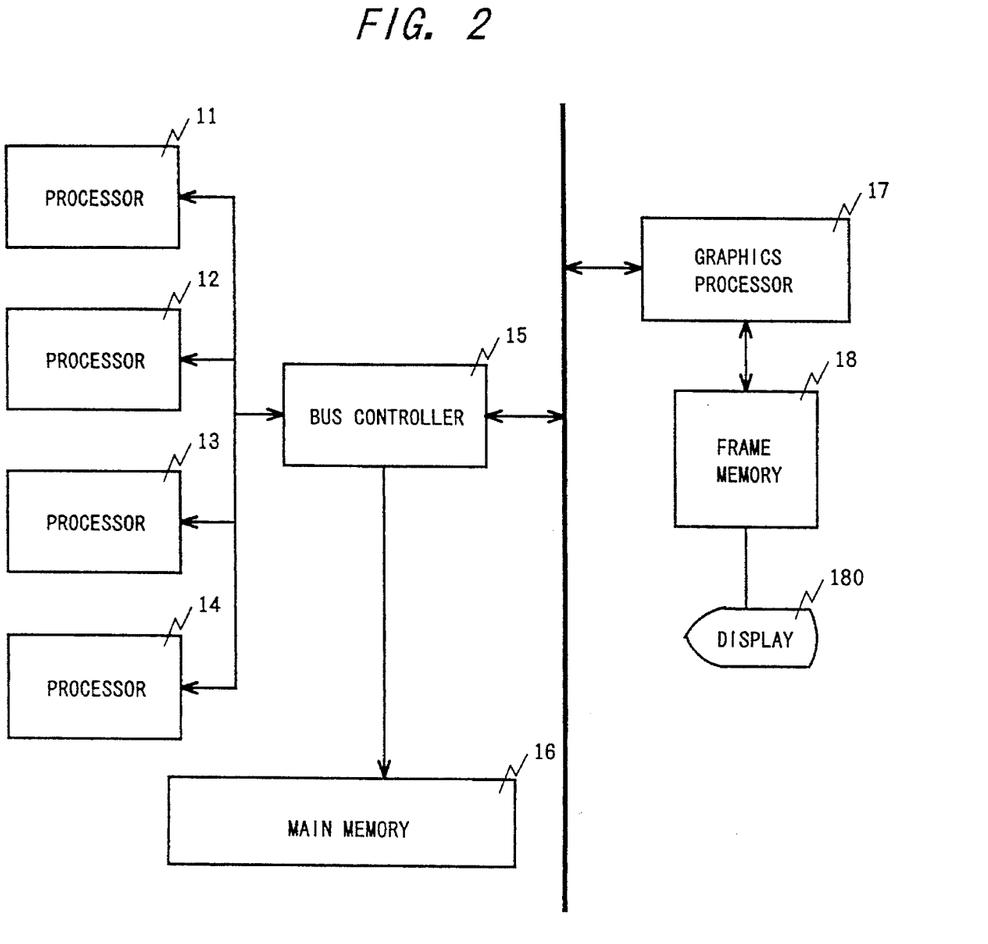
FIG. 2 is a block diagram showing the system configuration of the embodiment.

FIG. 2 is a block diagram showing the system configuration for executing display control by the present invention. Processors 11 to 14 are main processors of this system which use a main memory 16 which is connected to them via a bus controller 15 as a common memory. A graphics processor 17 interprets graphics commands which are sent from the processors 11 to 14 and writes image data to be displayed on the screen into a frame memory 18. An image by the image data which is stored in the frame memory at present is displayed on a display 180.

Figure 1:
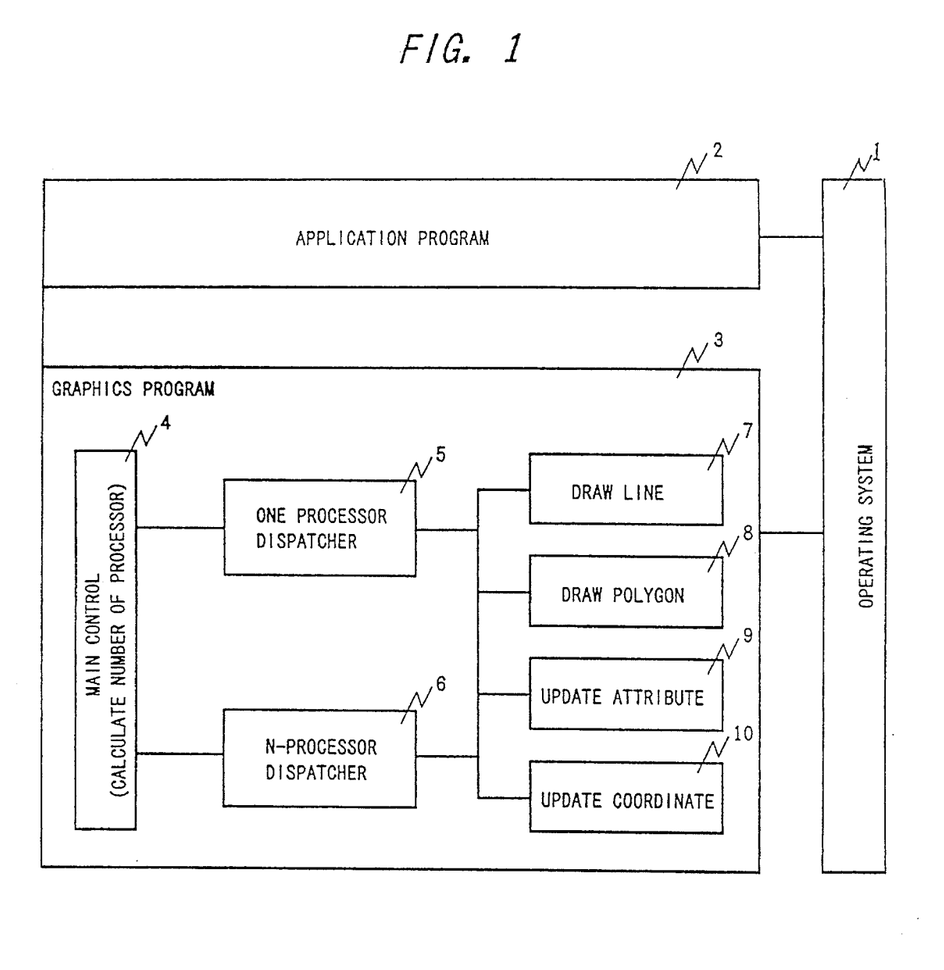
FIG. 1 is a functional block diagram showing the functions of the control program stored in the main memory of an embodiment of the present invention.

FIG. 1 is a block diagram showing the configuration of a program which is stored in the main memory 16 and operated by the processors 11 to 14. An operating system 1 is associated with a multi-processor having a function for allocating programs to the processors 11 to 14, a communication function among the programs, and an exclusive control function among the processors and operated by the processor 11. An application program 2 and graphics program 3 are operated using this operating system 1. Namely, the graphics program 3 converts a graphics output primitive which is generated by the application program 2 according to the object to a graphics command for the graphics processor 17 and performs output processing.

The application program 2 generates graphics output primitives necessary to draw graphics. The graphics output primitives comprises of two types of primitives such as primitives which can be executed in parallel and primitives which cannot be executed in parallel. The frequency of occurrences of each of the two types of graphics output primitives and the generation sequence are almost fixed depending on the object of the application program. Even if the point of view and the size of visual field for the display contents are changed (display changes on the display screen caused by rotation or position movement of a solid) during execution, the frequency of occurrences and sequence of each of the above two types of graphics output primitives are changed very little. The application program 2 sends the above graphics output primitives to the graphics program 3 using the inter-program communication function of the operating system 1. In this case, to reduce the number of uses of the inter-program communication function, the application program 2 buffers and sends a plurality of graphics output primitives to the graphics program 3. For example, assuming that 2560 graphics output primitives are necessary for the application program to draw graphics, and the mean length of the graphics output primitives is 16 bytes, and the buffer length for buffering is 4096 bytes, 256 primitives are sent for one inter-program communication and the communication is repeated 10 times. Graphics output primitives in the buffers for each inter-program communication are a part of the above series of graphics output primitives for drawing graphics. Therefore, the frequencies of occurrences of primitives which can be executed in parallel and primitives which cannot be executed in parallel in each buffer are almost the same as the frequency of occurrences of all the graphics output primitives.

The function blocks of the graphics program 3 are shown as blocks 4 to 10. Main control 4 has a function for controlling the entire graphics program. Particularly, the main control 4 analyzes the frequency of occurrences of each type of graphics output primitives which are sent from the application program 2 and obtains the ratio of running processors of programs which are most suited to operate the graphics program, that is, the most suitable number of processors to be used to execute the graphics output primitives. According to the obtained ratio of running processors, the main control 4 generates the graphics program itself as a plurality of processes using the function of the operating system 1. The generated plurality of processes (of the graphics programs) are operated by the processors 11 to 14 according to the allocation of the operating system 1.

Dispatchers 5 and 6 interpret graphics output primitives and execute processings 7 to 10 (line drawing, polygon drawing, attribute updating, coordinate updating) corresponding to the graphics output primitives. The dispatcher 5 is used when a graphics program contains only one process (namely, one general purpose processor is operated) and the dispatcher 6 is used when a graphics program contains a plurality of processes (namely, a plurality of general purpose processors are operated). The dispatchers are started by the main control 4.

Figure 3:
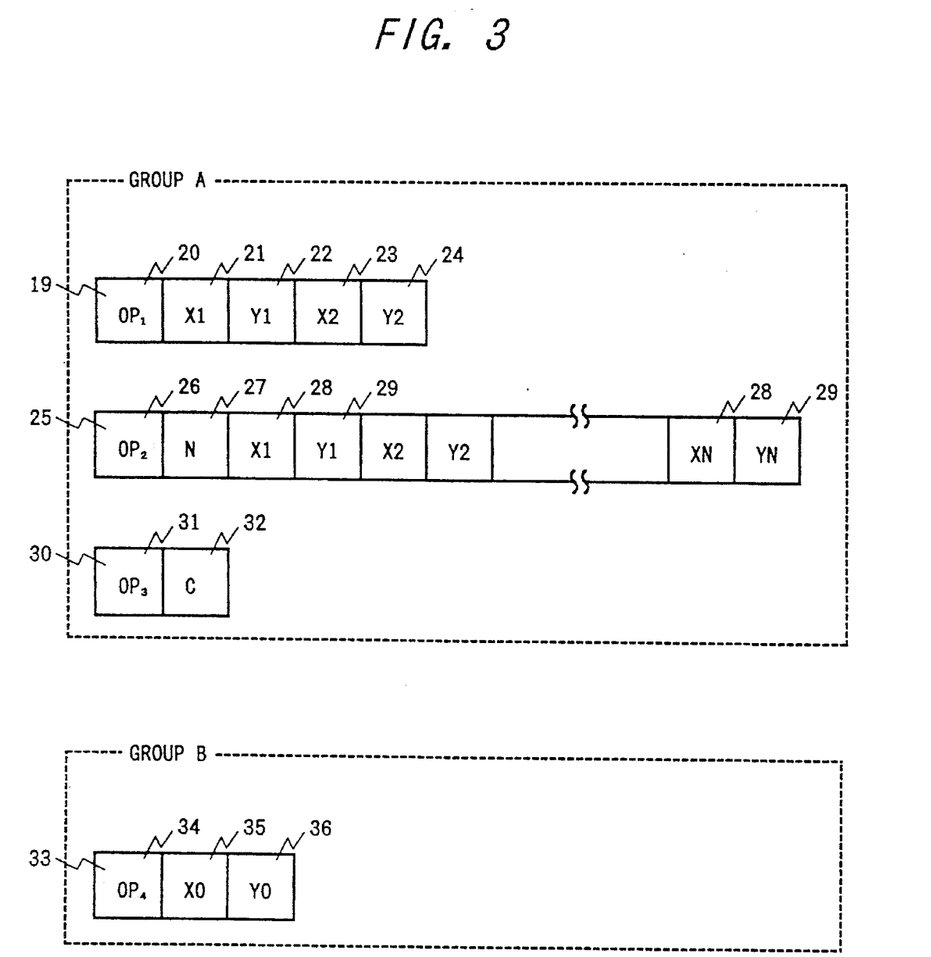
FIG. 3 is a conceptual diagram showing the format of graphics output primitives of the embodiment.

FIG. 3 shows the format of graphics output primitives to be processed by the graphics program 3. According to this embodiment, graphics output primitives are classified into graphics output primitives (group A) which can be executed in parallel and graphics output primitives (group B) which cannot be executed in parallel. The group A contains primitives 19, 25, and 30 and the group B contains a primitive 33.

The primitive 19 is a line primitive for drawing a line on the screen and comprises of an operation code 20, an X coordinate 21 and Y coordinate 22 of the start point of the line, and an X coordinate 23 and Y coordinate 24 of the end point. The primitive 25 is a polygon primitive for drawing a polygon which is painted out on the screen and comprises an operation code 26, a vertex count 27 indicating the number of vertexes, and an X coordinate 28 and Y coordinate 29 of each vertex. The primitive 30 is a color attribute setting primitive for designating the colors which are used on the screen by the line primitive 19 and polygon primitive 25 and comprises an operation code 31 and a color code 32. The primitive 33 is an offset setting primitive for designating the reference point when a line or polygon is to be drawn on the screen by the line primitive 19 or polygon primitive 25. The coordinates of the designated reference point are added to all coordinates of the line primitive 19 or polygon primitive 25. The primitive 33 comprises an operation code 34 and an X coordinate 35 and Y coordinate 36 of the reference point.

Figure 4:
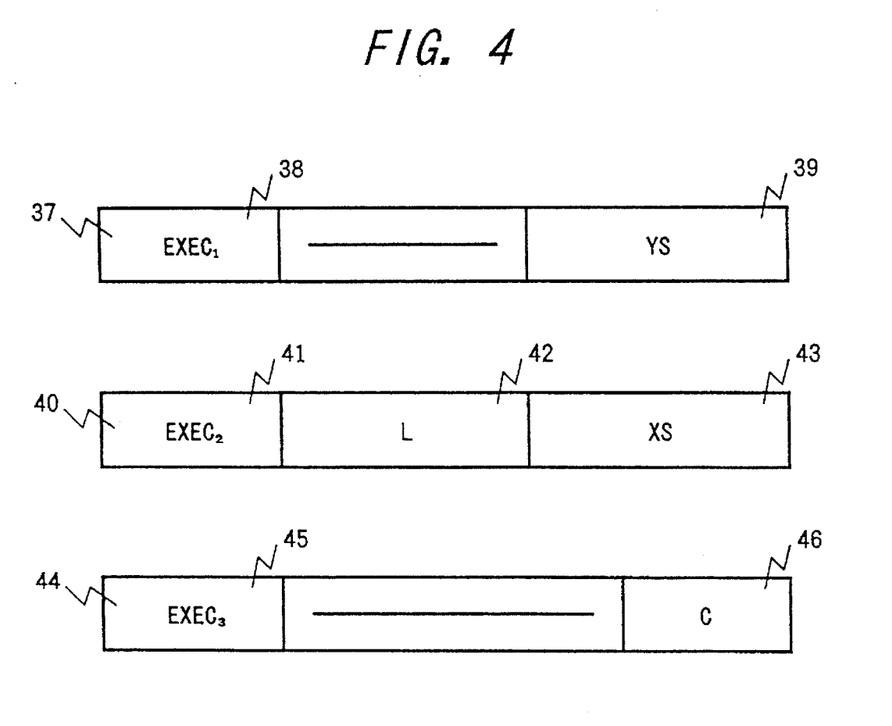
FIG. 4 is a conceptual diagram showing the format of graphics commands of the embodiment.

FIG. 4 shows the format of graphics commands which are processed by the graphics processor 17. Commands which are processed by the graphics processor 17 are classified into commands 37 and 40 for drawing a horizontal line on the screen and a command 44 for designating the color (46) to be used. The command 37 is a command for designating the Y coordinate of a horizontal line to be drawn and comprises an operation code 38 and a Y coordinate designation section 39. The command 40 is a command for designating the X coordinate of a horizontal line to be drawn and the horizontal length thereof and comprises an operation code 41, an X coordinate designation section 43, and a horizontal length designation section 42. When the command 40 is processed, 1 is automatically added to the Y coordinate. The command 44 comprises an operation code 45 and a color attribute setting section 46.

When processing the line primitive 19 or polygon primitive 25 which is generated by the application program 2, the graphics program 3 shown in FIG. 1 converts the line or polygon which is designated by the primitive in scan, calculates the horizontal line, and obtains the command format of the graphics processor 17. The conversion of graphics output primitives which can be executed in parallel to the command format of the graphics processor 17 is executed by a plurality of processes in parallel. Therefore, to transfer commands from the processors 11 to 14 to the graphics processor 17, the buffers shown in FIG. 5 are used to guarantee the command sequence.

Figure 5:
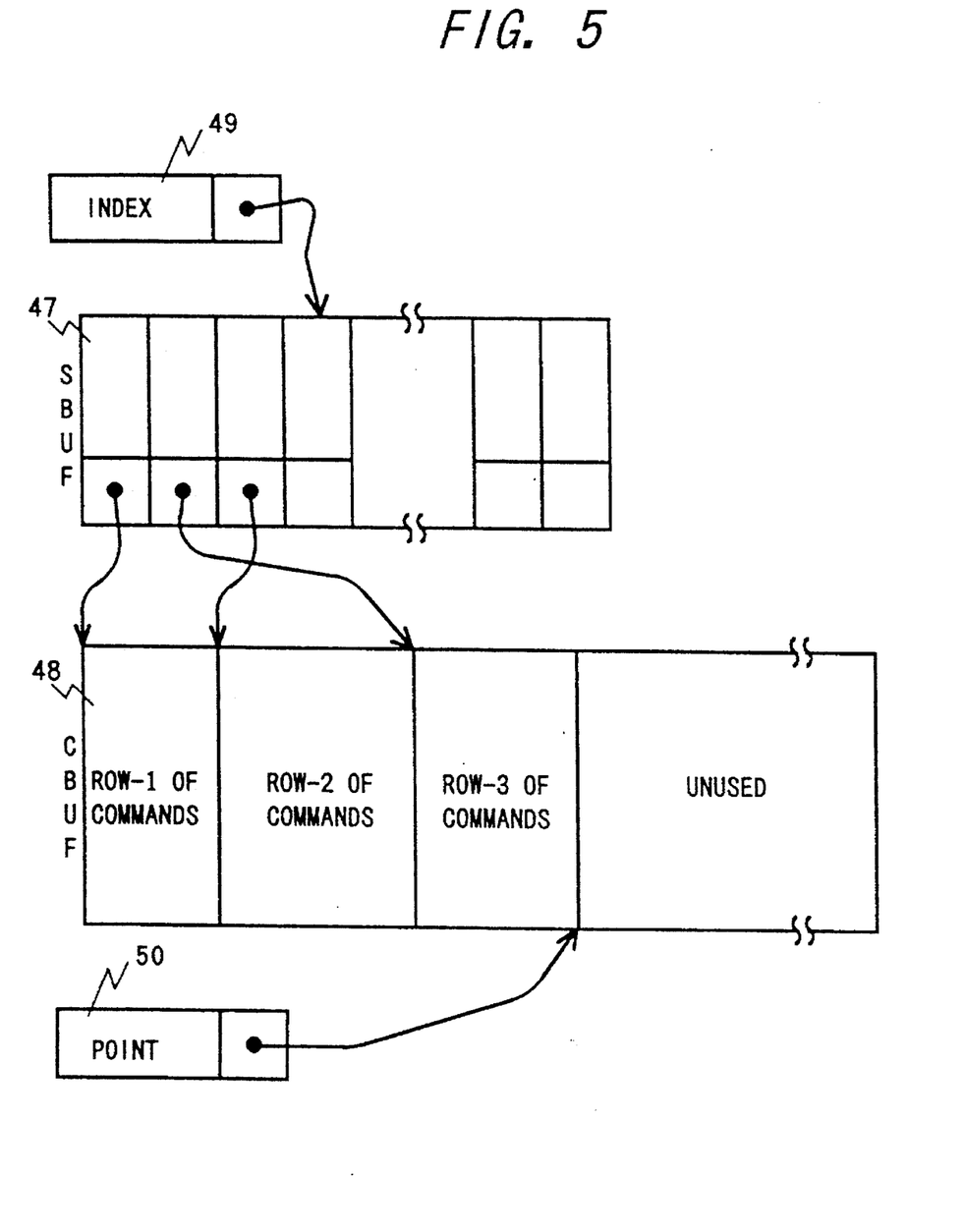
FIG. 5 is a conceptual diagram showing the storage format of graphics commands of the embodiment.

The buffers shown in FIG. 5 comprise a sequence buffer 47 for holding the command sequence and a command buffer 48 for storing command rows. An index 49 and a pointer 50 are used in the command rows and buffers 47 and 48 so as to indicate the position of an unused area of the buffers. The dispatcher 5 or 6 assigns the sequence buffer 47 at the position indicated by the index 49 in the sequence of graphics output primitives which are sent from the application program 2, passes the processes to the output processings 7 to 9, and updates the index 49. Each of the output processings 7 to 9 assigns the command buffer 48 from the position indicated by the pointer 50 by the necessary size of command buffer and saves the address of the assigned command buffer 48 in the sequence buffer 47 which is passed from the dispatcher 5 or 6. The commands 37, 40, and 44 are written into the command buffer 48 by a plurality of processes in parallel. Therefore, the commands may be written in a sequence which is different from the graphics sequence. However, by installing the sequence buffer 47, the graphics sequence is guaranteed.

Next, the detailed procedure of each of the processings 4 to 10 of the graphics program 3 will be explained with reference to FIGS. 6 to 12. The symbolic names used in the explanation of FIGS. 6 to 12 are data of the graphics program 3 which is stored in the main memory 16. The data is classified into two types, such as data which is shared by the processes and data which is reserved for each process as shown below.

(1) Data which is shared by each process

PMAX: Maximum number of processors which can be used by the graphics program 3

PC: Current number of processes of the graphics program 3

PN: Most suitable number of processes of the graphics program 3

ST: Status flag (0 indicates "input wait" and 1 indicates "in execution of output processing".)

SYNC1: Variable which is used by each process for synchronization

SYNC2: Variable which is used by each process for synchronization

TOTAL: No. of processed graphics output primitives

BOP: No. of graphics output primitives which belong to the group B among the processed graphics output primitives Others: Reference point coordinates for output processing (2) Data which is reserved for each process NO: No. for identifying the process itself (0 to 3 in this embodiment)

SEQ: Index of the sequence buffer which the process can be used for

Others: Work buffer for scan conversion

The above data for each process indicates that it is an area for each process, so that it is described as NO (i) or SEQ (i). Among the above data, a value of 1 is substituted for PMAX, PC, PN, TOTAL, BOP, SYNC1, and SYNC2 and a value of 0 is substituted for ST as an initial value.

Figure 6:
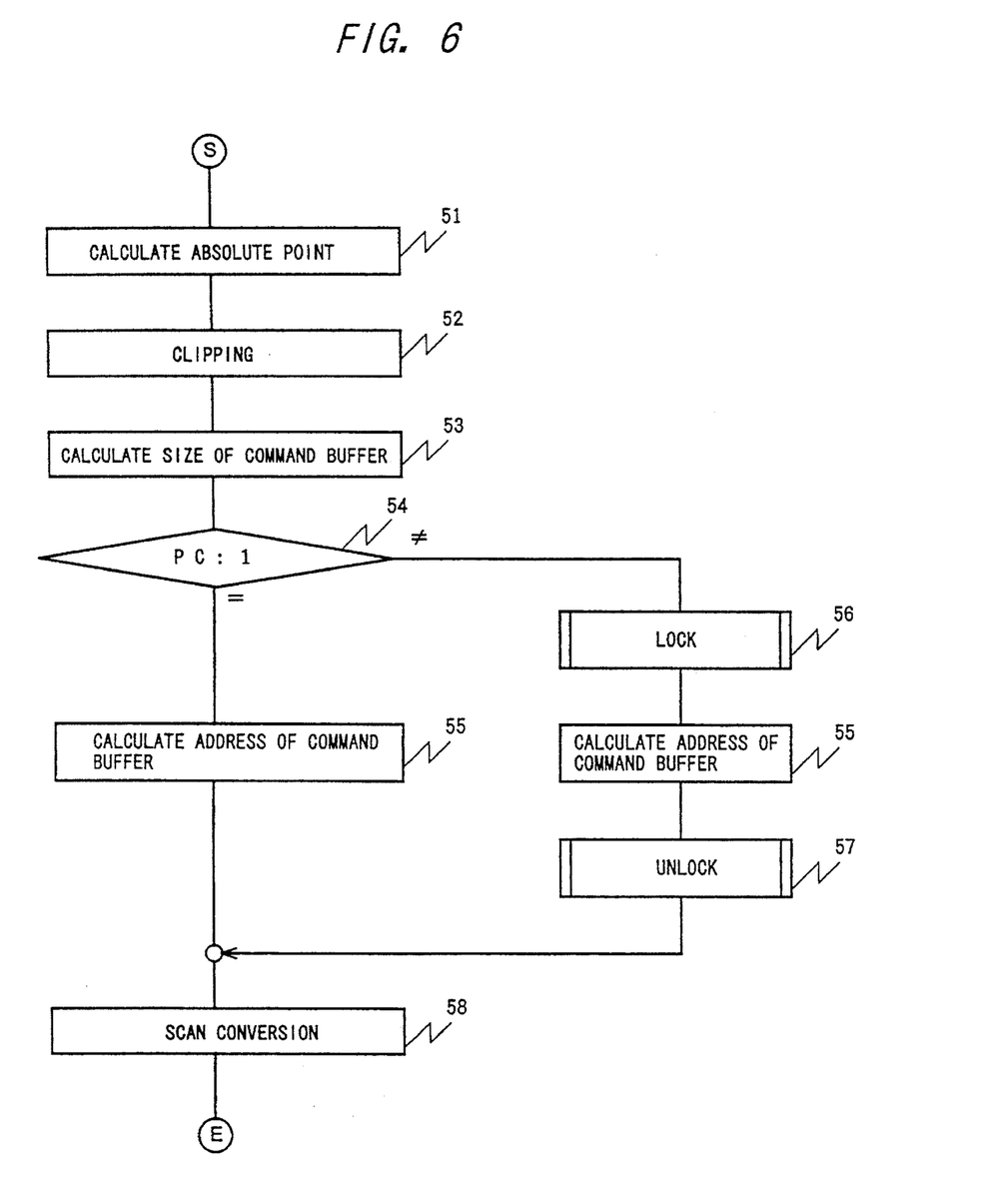
FIG. 6 is a flow chart showing the output processing procedure of the embodiment.

Firstly, the outlined processings of the line drawing 7 and polygon drawing 8 will be explained with reference to FIG. 6. In FIG. 6, the coordinates of a graphics output primitive which is sent from the application program 2 are relative coordinates from the coordinates of the reference point which are designated by the offset primitive 33. Therefore, the coordinates of the reference point are added to the coordinates of the graphics output primitive and absolute coordinates on the screen are calculated (Step 51). Next, the part of the graphics outside the screen is clipped (Step 52) and the number of horizontal lines which are generated from the minimum value and maximum value of the Y coordinate is obtained and the necessary size of the command buffer 48 is obtained (Step 53). The command buffer 48 is commonly accessed by each process. Therefore, the number of processes PC of the graphics program 3 which is in operation at present is decided (Step 54). When the number of processes PC is 1, the address of the pointer 50 is updated using the size obtained at Step 53 and an area is obtained in the command buffer 48 (Step 55-A). When the number of processes PC is larger than 1, that is, when a plurality of general-purpose processors are operating, locking 56 which is the exclusive control function of the operating system 1 is called and then an area is obtained in the command buffer 48 (Step 55-B). Next, unlocking 57 is called. A command to the graphics processor which is a result of scan conversion 58 is written into the addresses of the command buffer 48 which are assigned like this and the processing ends.

Figure 7:
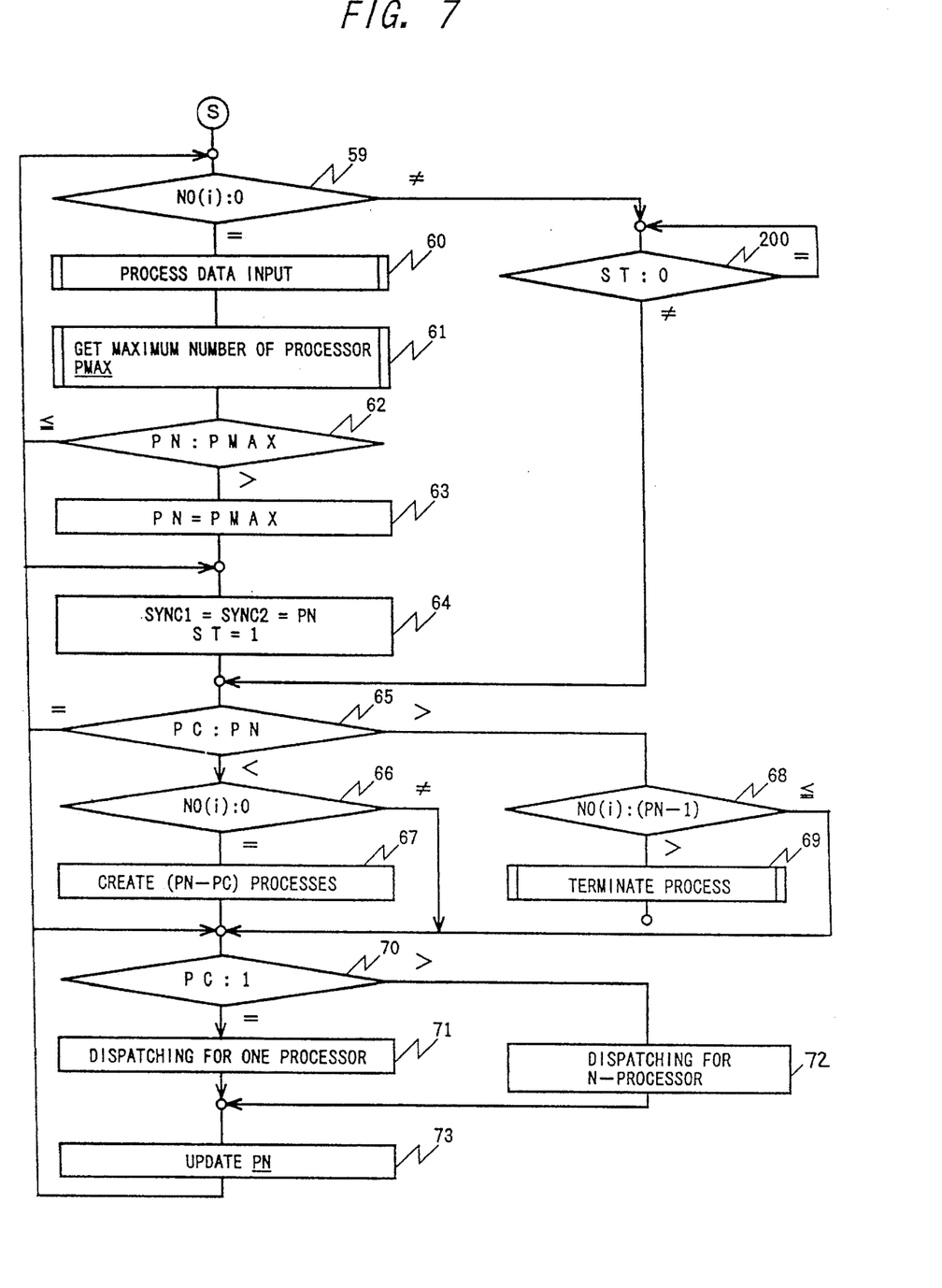
FIG. 7 is a flow chart showing the entire main control procedure of the embodiment.
Figure 8:
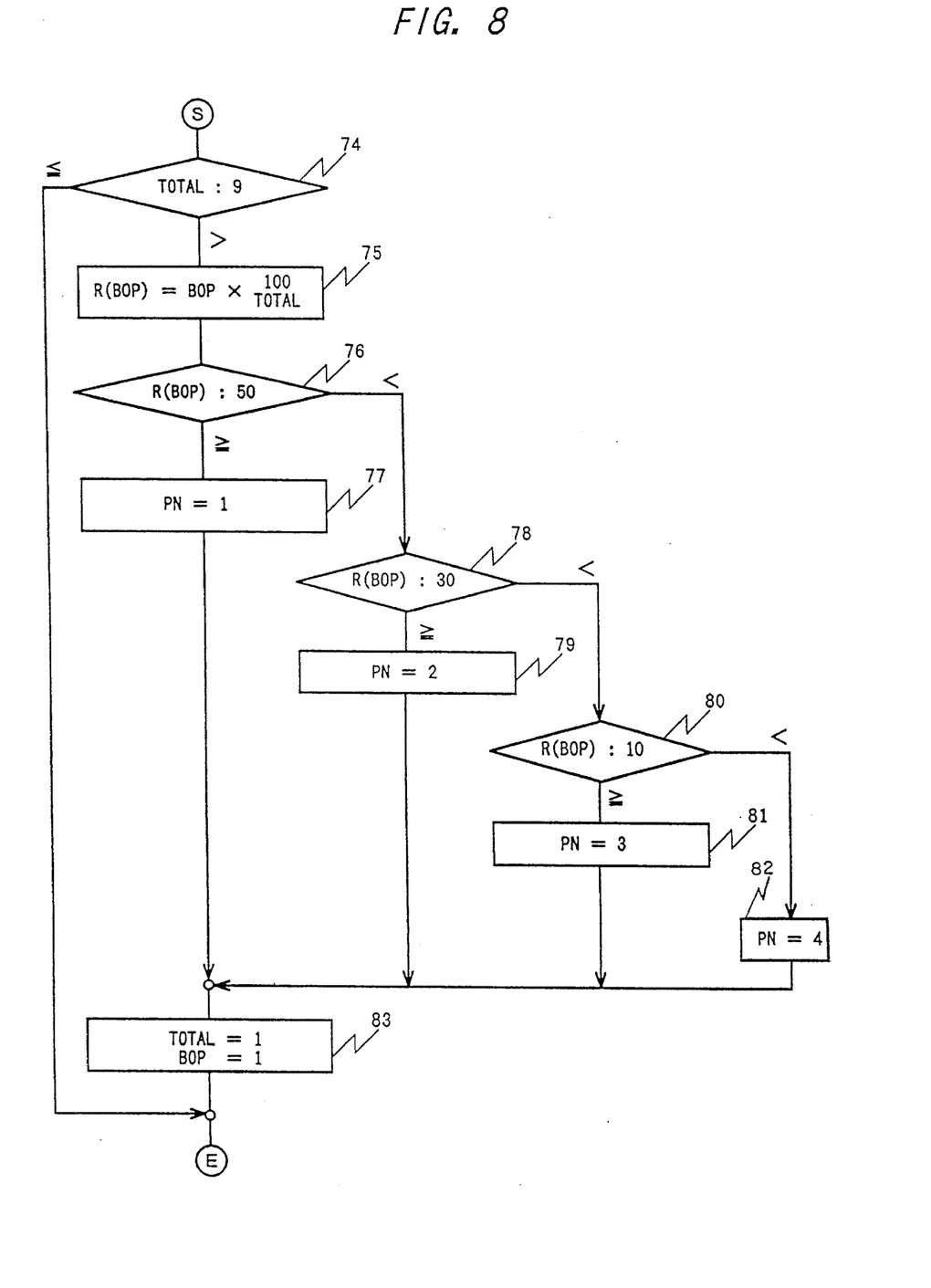
FIGS. 8, 9, 10, 11, and 12 are flow charts showing the detailed parts of the main control procedure of the embodiment.

FIGS. 7 and 8 show the detailed processing procedure of the main control 4. Firstly, FIG. 7 will be explained.

Since a plurality of processors among the processors 11 to 14 may operate the graphics program 3 in parallel, only a graphics program which is operated by one processor waits for input from the application program 2 and a graphics program which is operated by another processor waits until the next input is sent. Firstly, when the process number is 0 (Step 59), the process waits for input of a graphics output primitive (Step 60) and the other processes are stopped until ST becomes 1 (Step 200). When graphics output primitives (a plurality of graphics output primitives which are buffered and sent) are sent from the application program 2, the input wait status is canceled (Step 60) and the maximum number of processors PMAX which can be used by the graphics program 3 is obtained from the operating system 1 (Step 61). PMAX may be obtained from the operation rate of each processor. The explanation will be continued hereunder on the assumption that a number of 4 which is the number of processors connected to the hardware is obtained as PMAX. Next, PMAX is compared with PN (Step 62). When PMAX is smaller than PN, the value of PMAX is substituted for PN (Step 63). When the value of PN is substituted for SYNC1 and SYNC2 and a value of 1 is substituted for ST (Step 64), the stop of other processes (Step 200) is canceled. Processing 65 to processing 69 vary with each process. At Step 65, the current number of processes PC is compared with the most suitable number of processes PN. When the current number of processes is smaller than the most suitable number of processes, the process whose number is 0 creates new processes in the different number between PN and PC and updates the value of PC (Steps 66 and 67). When the current number of processes PC is larger than the most suitable number of processes PN, the processes whose numbers are more than PN-1 are all terminated (Steps 68 and 69). As a result, the number of processes to be executed is equal to PN.

Next, at Step 70, the value of PC is decided. When the value of PC is 1, the dispatcher 5 for one processor is called (Step 71). When the value of PC is larger than 1, the dispatcher 6 for a plurality of processors is called (Step 72). Even when either of the dispatchers is called, graphics output primitives which are transferred to the buffer from the application program 2 at a time, for example, 256 graphics output primitives are all executed by the processing of the dispatcher. When the series of execution ends, the most suitable number of processes PN is newly calculated from the rate of graphics output primitives belonging to the group B among the graphics output primitives which are executed at Step 73 and the value of PN is updated for execution of the graphics output primitives to be transferred to the buffer next time. The control waits for input from the application program 2 in this state.

FIG. 8 shows details of PN updating 73. When the dispatcher processing shown at Step 71 or 72 in FIG. 7 ends, TOTAL and BOP are updated depending on the number of processed graphics output primitives. Therefore, the most suitable number of processes is obtained using the updated values of TOTAL and BOP. In the example shown in FIG. 8, when the number of processed graphics output primitives is 9 or smaller, PN is not updated. Therefore, the value of TOTAL is decided first (Step 74). When the value of TOTAL is higher than 9, the rate R(BOP) of the number of primitives belonging to the group B among the processed graphics output primitives is obtained (Step 75). When the obtained rate R(BOP) is 50% or more, set PN to 1 (Steps 76, 77), or when it is between 30% and 49%, set PN to 2 (Steps 78, 79), or when it is between 10% and 29%, set PN to 3 (Steps 80, 81), or when it is 9% or less, set PN to 4 (Step 82). When PN is updated, set TOTAL and BOP to 1 once again (Step 83). The relationship between the rate R(BOP) of the number of primitives and the most suitable number of processes PN is not limited to that shown in the embodiment. A structure that the relationship between R(BOP) and PN is inputted and set from an input device connected to this display device at the initial start of the display device may be used.

Figure 9:
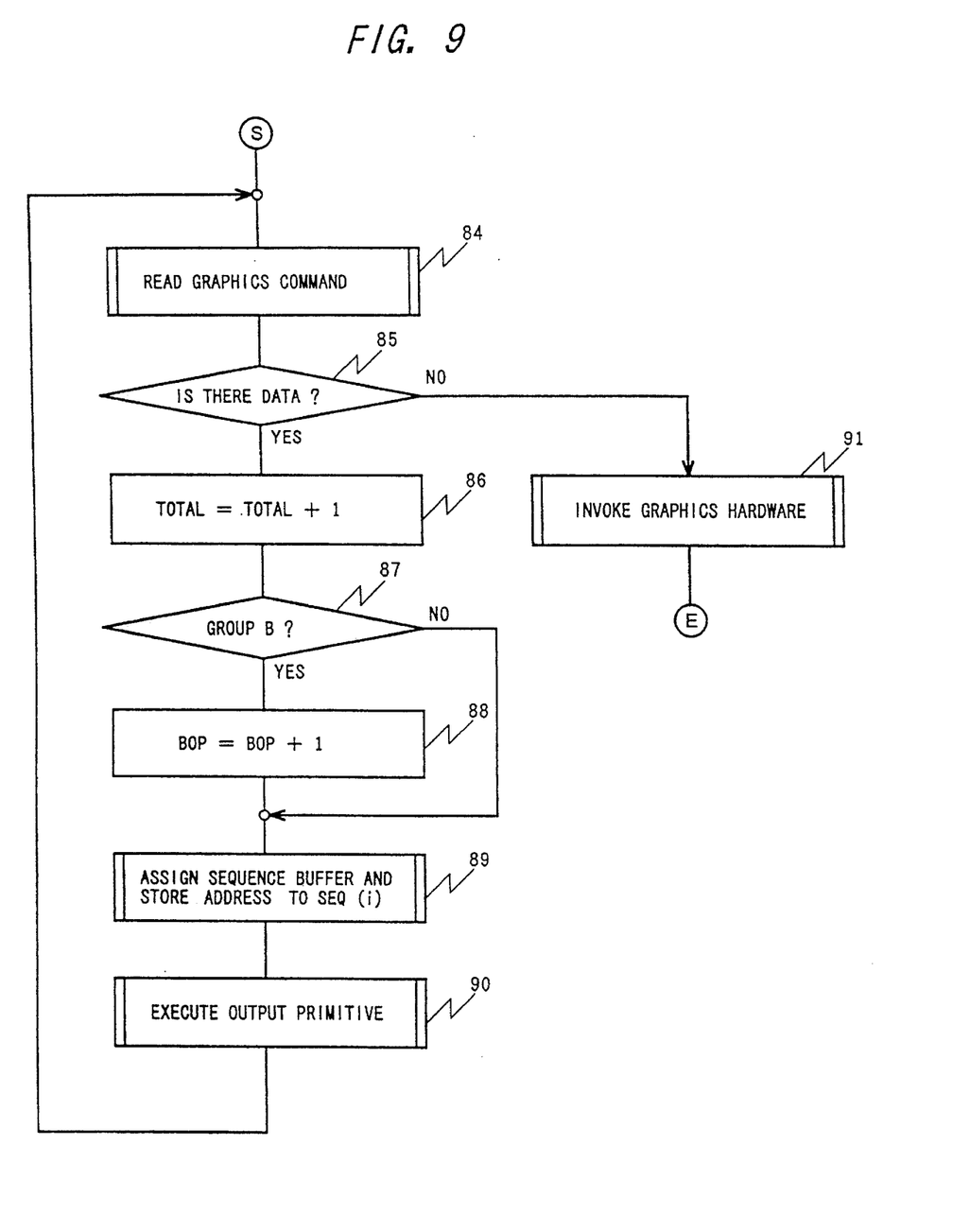

FIG. 9 shows the detailed processing of the dispatcher 5 for one processor at Step 71 shown in FIG. 7. The processing of a dispatcher for one processor is simple because no exclusive control for other processes is necessary. The dispatcher 5 reads graphics output primitives in the buffer which are sent from the application program 2 (Step 84), adds 1 to TOTAL when there is data (a graphics output primitive) (Steps 85, 86), and adds 1 to BOP when the graphics output primitive belongs to the group B (Steps 87, 88). Next, the dispatcher 5 assigns the sequence buffer 47 if necessary, stores the address in SEQ(i) (Step 89), and calls each output processing (Step 90). The dispatcher 5 repeats Step 84 to Step 90 until the data is processed and starts the graphics hardware (Step 91).

Figure 10:
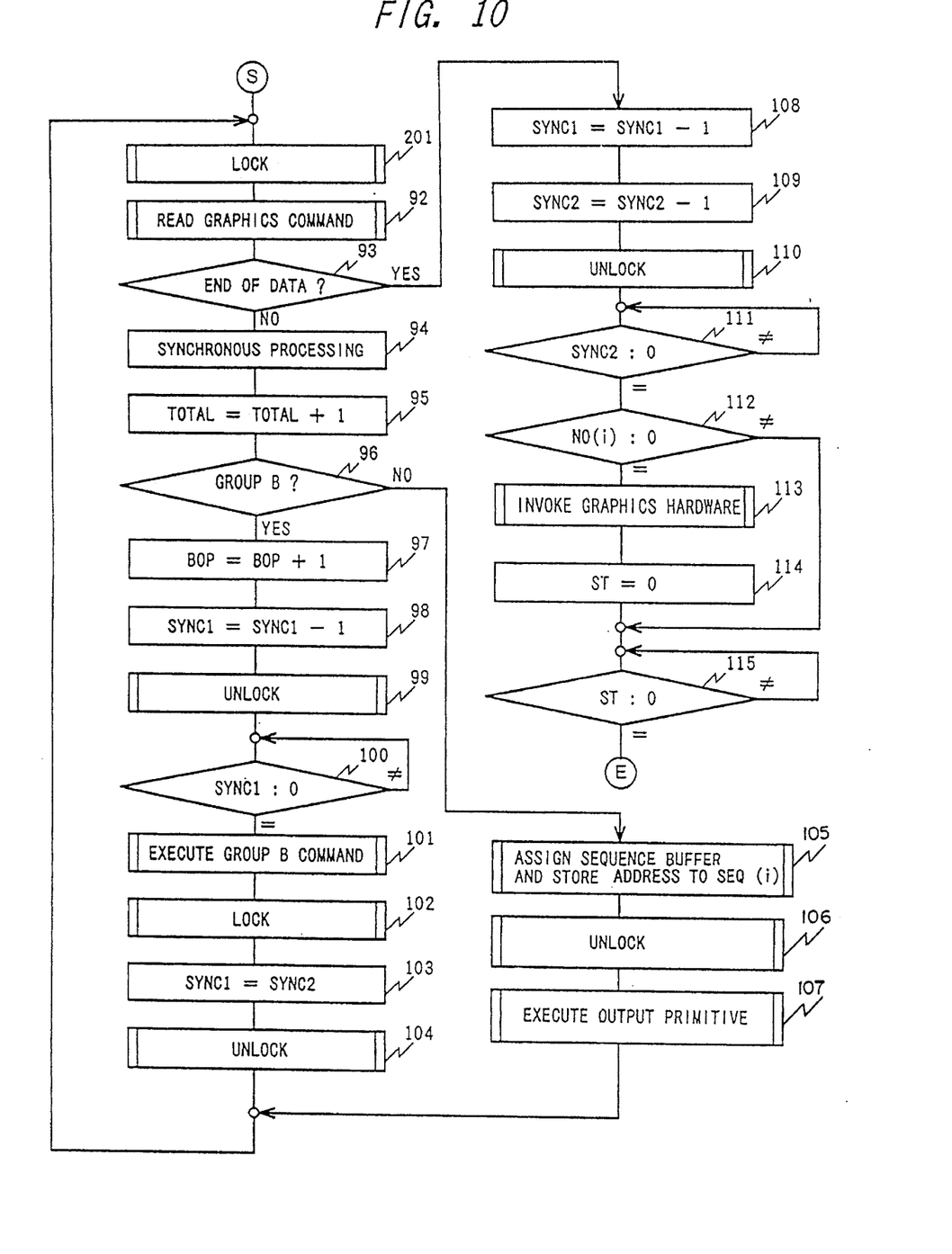
Figure 11:
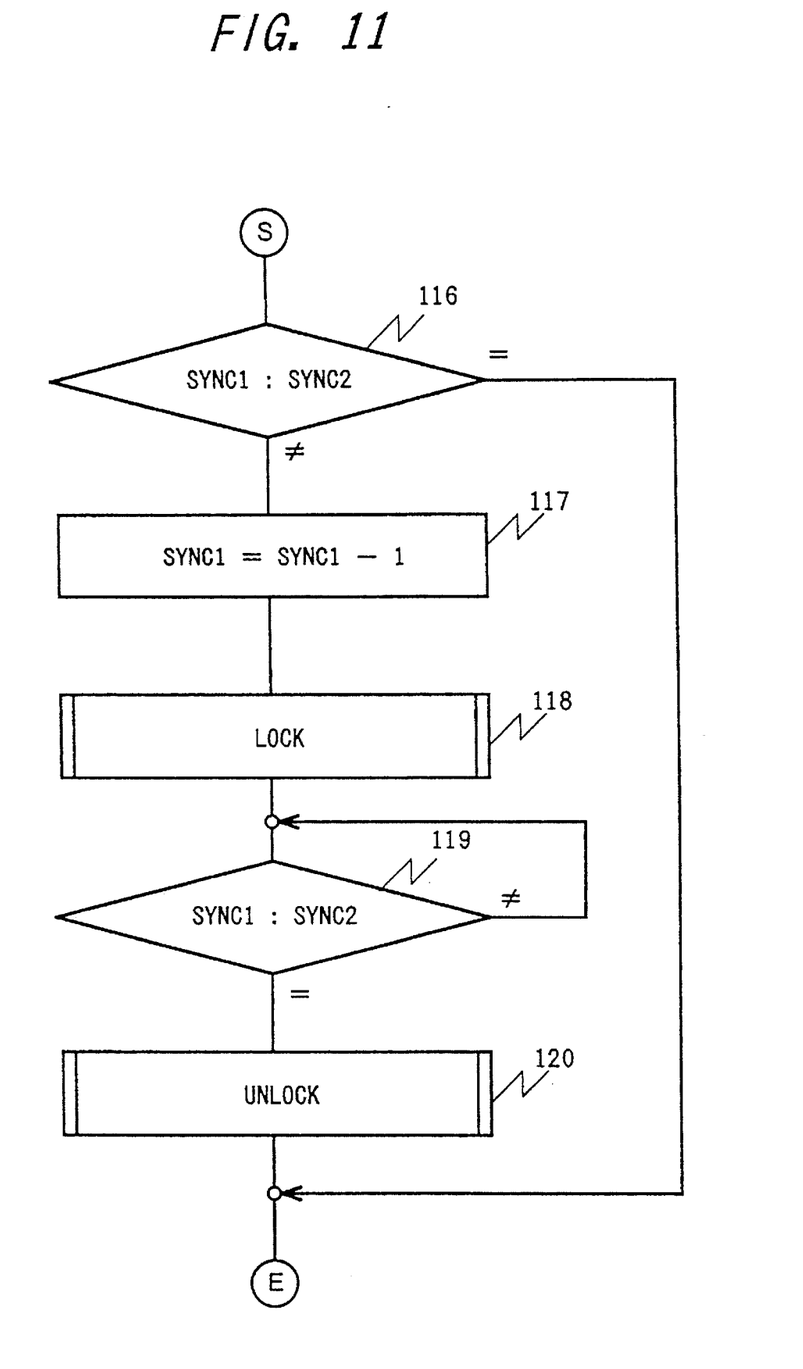

FIGS. 10 and 11 show the detailed processing of the dispatcher 6 for a plurality of processors at Step 72 shown in FIG. 8. The processing of a dispatcher for a plurality of processors requires exclusive control and synchronous control because a plurality of processes refer to common data (namely, graphics output primitives in the buffer which are sent from the application program 2, the command buffer to the graphics processor, etc.).

In FIG. 10, the dispatcher 6 for a plurality of processors calls locking at the start of processing (Step 201). The dispatcher 6 locks the process of another graphics program 3 by the locking, reads graphics output primitives in the buffer which are sent from the application program 2 (Step 92), and decides whether there is data or not (Step 93). When there is data (a graphics output primitive), the dispatcher 6 processes the graphics output primitive (Steps 94 to 107). When there is no data, the dispatcher 6 executes the dispatcher end processing (Steps 108 to 115).

Graphics output primitives cannot be processed when another process is processing primitives belonging to the group B. Therefore, the dispatcher 6 executes synchronous processing first so as to avoid it (Step 94). The synchronous processing 94 at Step 94 will be described in detail later with reference to FIG. 11. When the processing at Step 94 is performed, the dispatcher 6 adds 1 to TOTAL (Step 95) and decides whether the graphics output primitive belongs to the group B (Step 96). When the graphics output primitive belongs to the group B, the dispatcher 6 adds 1 to BOP (Step 97) and performs processing for waiting for stop of other processes (Steps 98 to 100). This is a kind of synchronous processing which is necessary when updating the coordinates of the reference point which is referred to by each output processing (7, 8) like the offset setting primitive 33. The dispatcher 6 subtracts 1 from the value of SYNC1 at Step 98 and calls unlocking at Step 99. At Step 100, the dispatcher 6 decides whether the value of SYNC1 is 0 or not and keeps the own process in the standby state until the value of SYNC1 becomes 0, that is, the other processes are stopped. When the standby state is canceled, the dispatcher 6 processes the graphics output primitives belonging to the group B (Step 101) and resets the value of SYNC2 to the value of SYNC1 by keeping synchronization under exclusive control (Steps 102 to 104). When it is decided at Step 96 that the graphics output primitive does not belong to the group B, the dispatcher 6 assigns the sequence buffer 47, stores the address in SEQ(i) (Step 105), calls unlocking (Step 106), and executes the graphics output primitive (Step 107).

When the data (graphics output primitives) in the buffer which is sent from the application program 2 is all processed, it is decided at Step 93 that there is no data. Then, the dispatcher 6 executes the synchronous processing for ending in each process (Steps 108 to 111). Namely, the dispatcher 6 subtracts 1 from the value of SYNC1 (Step 108), subtracts 1 from the value of SYNC2 (Step 109), calls unlocking (Step 110), and keeps the own process in the standby state until the value of SYNC2 becomes 0 (Step 111). Furthermore, the dispatcher 6 decides whether the process whose number is 0 is processed (Step 112). When the process number is 0, the dispatcher 6 starts the graphics hardware (Step 113), sets the value of ST to 0 (Step 114), and ends the dispatcher processing. When the process number is other than 0, the process is stopped until the value of ST becomes 0 (Step 115).

FIG. 11 shows the detailed synchronous processing at Step 94 shown in FIG. 10. At Step 116, the value of SYNC1 is compared with the value of SYNC2. When the two values are different from each other, it means that another process requests synchronous processing. Therefore, the dispatcher 6 subtracts 1 from the value of SYNC1 (Step 117) and calls unlocking so as to cancel the lock (Step 118). At Step 119, the dispatcher 6 compares the values of SYNC1 and SYNC2. When the two values are not equal, the dispatcher 6 stops the own process. When the values of SYNC1 and SYNC2 become equal, the dispatcher 6 calls locking once again at Step 120 and executes Step 95 and the subsequent steps. By such synchronous processing, the graphics output primitives in the group B are always executed only by one process.

Using the processing procedures shown in FIGS. 6 to 11, output processing using a multi-processor can be realized. According to this embodiment, the rate of graphics output primitives belonging to the group B among the graphics output primitives which are sent and executed to the graphics program 3 from the application program 2 at a time is calculated. Namely, the analytical result indicating the frequency of occurrences of graphics output primitives which cannot be processed in parallel is obtained. On the basis of this analytical result, the number of processors to be used to process graphics output primitives which are to be sent next time is determined. Namely, when the frequency of occurrences of graphics output primitives belonging to the group B is high, the number of processors is decreased and the overhead due to synchronous processing is decreased. When the frequency of occurrences of graphics output primitives belonging to the group B is inversely low and the frequency of occurrences of graphics output primitives (belonging to the group A) which can be processed in parallel is high, the number of processors is increased and the processing time of graphics output primitives in the buffer can be shortened.

According to the above embodiment, the most suitable ratio of running processors is obtained from the rate of graphics output primitives belonging to the group B among the graphics output primitives which are sent to the buffer from the application program 2 at a time. However, by analyzing the frequency of occurrences in consideration of the occurrence distribution such that graphics output primitives of each group occur alternately or continuously respectively, the rate of running processors can be controlled more accurately. For example, by, dividing the frequency of occurrences of the group B into the frequency of occurrences when graphics output primitives of the group B occur continuously and the frequency of occurrences when graphics output primitives of the group B occur behind the group A and analyzing both the frequencies, the rate of running processors can be managed. For that purpose, it is desirable to perform the processing shown in FIG. 12 in place of Step 88 in FIG. 9 and Step 97 in FIG. 10 among the processing procedures shown in FIGS. 6 to 11. The symbolic names shown in FIG. 12 indicate areas common to all the processes and the meanings thereof are as shown below.

Figure 12:
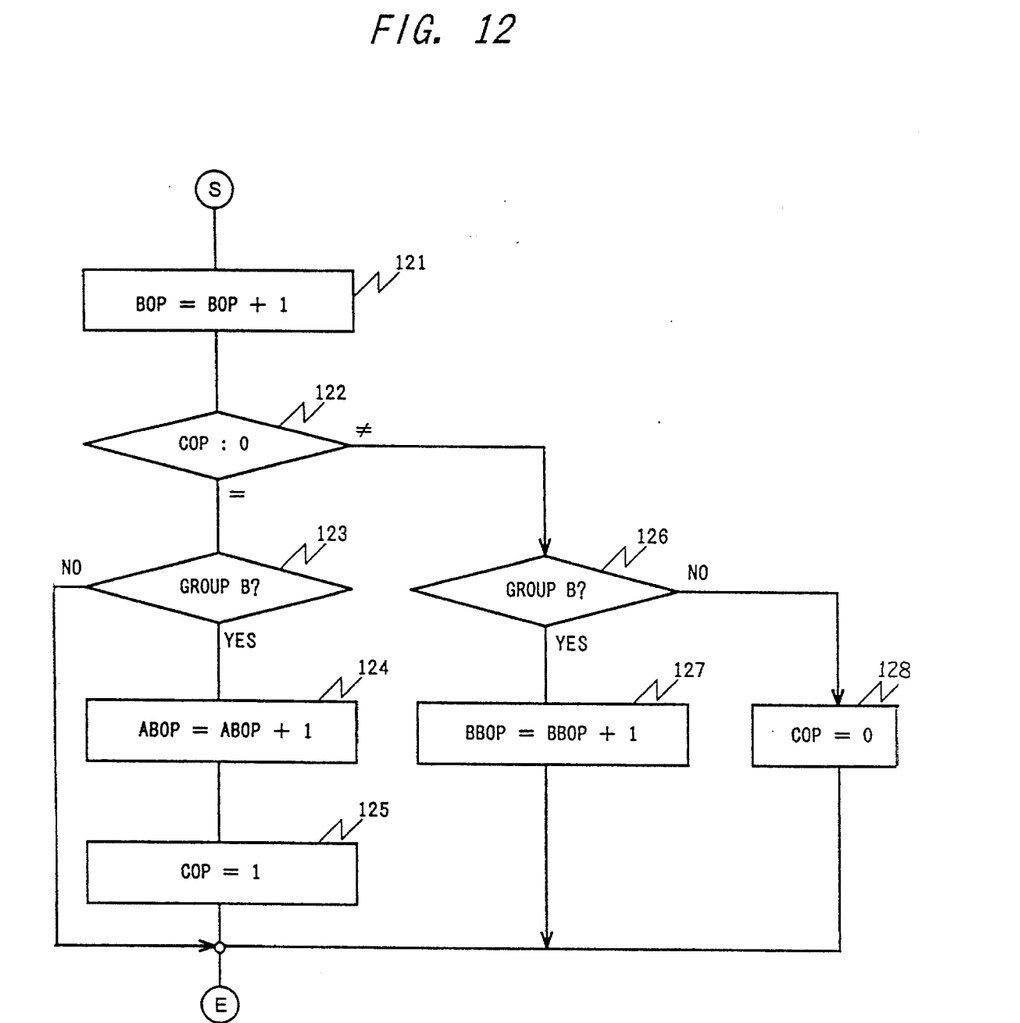

BBOP: Number of graphics output primitives of the group B which occur continuously behind graphics output primitives of the group B ABOP: Number of graphics output primitives of the group B which occur behind graphics output primitives of the group A COP: Flag indicating the classification of the primitives which are processed last time (0: group A, 1: group B)

In FIG. 12, the dispatcher 6 adds 1 to BOP (Step 121) and discriminates COP (Step 122). When COP is 0, that is, when the primitive which is processed last time belongs to the group A and the current primitive belongs to the group B (Step 123), the dispatcher 6 adds 1 to ABOP (Step 124) and substitutes 1 for COP (Step 125). When COP is 1, that is, when the primitive which is processed last time belongs to the group B and the current primitive also belongs to the group B (Step 126), the dispatcher 6 adds 1 to BBOP (Step 127). When the current primitive belongs to the group A inversely, the dispatcher 6 substitutes 0 for COP (Step 128). By doing this, the numbers of processings are held in BBOP and ABOP respectively. When graphics output primitives of the group B are continuous even if the frequency of occurrences of graphics output primitives of the group B is high, the effect of parallel processing of graphics can be expected and the number of processors can be increased. For example, the rate of the value of BBOP to the value of BOP is calculated after Step 77 of the procedure for determining the number of processors in FIG. 8. When the rate is more than a predetermined value, a step for changing PN to 2 or more than 2 is inserted. Namely, when the rate of continuous graphics output primitives of the group B is high even if the rate of graphics output primitives of the group B to processed graphics output primitives is more than 50%, graphics output primitives are executed by parallel processing of at least 2 processors.

According to the above embodiment, the number of processors is changed in all the processes of the application program according to the frequency of occurrences and trend of occurrences of graphics output primitives. However, as mentioned above, the frequency of occurrences and trend of occurrences of graphics output primitives of the application program are apt to be fixed in all the processes. Therefore, the frequency of occurrences and trend of occurrences of graphics output primitives up to the point of time when a fixed number of or a fixed rate of graphics output primitives of the application program is executed can be used as representative values covering all the processes of the application program.

In this case, the number of processors is determined once and a step for determining the number of processors which is an overhead can be omitted from the later execution of graphics output primitives of the application program. The aforementioned fixed number or rate can be inputted from an input device which is connected to this display device when the display device is started. According to the above embodiment, the initial value of the number of processors to be used by the graphics program 3 is fixed to 1 and the number of processors to be used is obtained every output processing. On the other hand, the frequency of occurrences of graphics output primitives for drawing graphics data of the application program 2 is not changed even if the point of view and the size of visual field are changed. Therefore, when redisplaying the graphics contents which are displayed once, there is no need to recalculate the frequency of occurrences, and the value of variable PN which is calculated last time can be reused as it is, and the overhead caused by obtaining the most suitable rate of running processors (variable PN) from the graphics program 3 can be omitted.

To realize this, the application program 2 is provided with a PN request function for issuing an instruction to inform the application program 2 of the value of variable PN during execution of a graphics output primitive when the graphics program 3 executes the graphics output primitive for the first time, a PN recording function for recording the value of variable PN which is informed from the graphics program 3, and a PN designation function for sending the value of variable PN to the graphics program 3 simultaneously with sending of a graphics output primitive when reexecuting the application program itself. On the other hand, the graphics program 3 is provided with a PN information function for informing the graphics program 3 of the value of variable PN of the graphics program itself using the inter-program communication function according to a request from the above PN request function and a PN resetting function for setting the value of variable PN which is sent from the above PN designation function. When executing a graphics output primitive of the application program 2 for the first time, the graphics program 3 executes the PN request function, PN information function, and PN recording function. When executing the application program for the second time and thereafter, the graphics program 3 executes the PN designation function and PN resetting function. As a result, the above object can be accomplished.

According to the above embodiment, only one application program is drawn on the screen. However, the present invention may be applied to a window system for displaying a plurality of windows on the screen. The graphics program 3 in FIG. 1 is equivalent to the window system and a plurality of application programs 2 present a graphics request to the window system. When a plurality of windows are displayed on the screen, application programs requesting display in the windows are different from each other and the display content varies with the application program. Therefore, by obtaining the frequency of occurrences for each application program, the present invention can be applied. For example, it is assumed in the above embodiment that Step 60 (waiting for input of a graphics output primitive) in FIG. 7 is processing for deciding the window for display (the application program from which the graphics request is presented). In place of a single variable PN, a variable PN is set and held for each application program and the number of processors to be used is set for each application program. At Step 60 and the subsequent steps in FIG. 7, only graphics output primitives from one application program are processed and when executing graphics output primitives from other application programs, Step 60 is executed once again. By this modification, the present invention can be also applied to the window system.

A means for automatically changing the ratio of running of a plurality of processors in the graphics system is explained above using an example of processing of graphics output primitives. However, this procedure is effective not only in the aforementioned control of the number of processors for processing graphics output primitives but also in automatic changing of the ratio of running processors of a parallel processor for executing general primitives by a plurality of processors.

What is claimed is:

1. A graphics system having a plurality of processors to be operated in parallel comprising means for:

classifying a series of graphics output primitives created by an application program into a plurality of groups according to characteristics thereof;

obtaining at least a frequency of occurrence of at least one of the graphics output primitives belonging to at least one of the classified groups, said frequency being in correspondence with the one of said classified groups; and determining a number of processors in said plurality of processors, for executing at least a graphics output primitive to be processed after obtaining said at least a frequency according to said frequency of occurrence.

2. The graphics system using parallel processors according to claim 1, wherein said means for classifying classifies graphics output primitives into graphics output primitives which can be executed in parallel among said processors and graphics output primitives which cannot be executed in parallel among said plurality of processors.

3. The graphics system using parallel processors according to claim 1, wherein said means for obtaining obtains at least a frequency of occurrence of at least a graphics output primitive among a plurality of graphics output primitives transferred to a request buffer at a time to be processed; and said means for determining determines a number of processors to be allotted to execution of the graphics output primitives to be transferred to said request buffers at a next time.

4. The graphics system using parallel processors according to claim 1, wherein said means for obtaining at least a frequency obtains a frequency of occurrence of at least a primitive belonging to at least one of said classified groups among graphics output primitives of an expected number of a series of graphics output primitives created by said application program; and said means for determining a number of processors, determines a number of processors to be allotted to execution of the remaining graphics output primitives among a series of graphics output primitives created by said application program.

5. A graphics system having a plurality of processors to be operated in parallel, comprising means for:

classifying a series of graphics output primitives created by an application program, into a first group of graphics output primitives which can be executed in parallel among said plurality of processors and a second group of graphics output primitives which cannot be executed in parallel among said plurality of processors;

obtaining at least a frequency of occurrence of at least a graphics output primitive which is classified as one of said second group of graphics output primitives;

obtaining a frequency of continuous occurrences of said at least a graphics output primitive classified as one of said second group of graphics output primitives; and determining a number of processors in said plurality of processors, for executing at least a graphics output primitive to be processed after obtaining said frequency of occurrence and said frequency of continuous occurrences, according to said frequency of occurrence and said frequency of continuous occurrences.

6. The graphics system using parallel processors according to claim 5, wherein said means for determining the number of processors determines said number of processors as one only when the obtained frequency of occurrence corresponds to graphics output primitives classified as one of said second group and is higher than a predetermined value; and changes said number of processors to greater than or equal to two when said frequency of continuous occurrences is higher than a predetermined value.

7. A parallel processor having a plurality of processors for executing primitives in parallel, comprising the means of:

classifying said primitives into a plurality of groups according to characters of said primitives;

obtaining at least a frequency of occurrence of at least a primitive belonging to at least one of the classified group, said frequency being in correspondence with one of said classified groups; and determining a number of processors in said plurality of processors, for executing at least a primitive to be processed after obtaining said at least a frequency, according to said frequency of occurrence.

8. The parallel processor according to claim 7, wherein said primitives are graphics output primitives, and said means for classifying classifies said graphics output primitives into a first group of graphics output primitives which can be executed in parallel among said plurality of processors, and a second group of graphics output primitives which cannot be executed in parallel among said plurality of processors.

9. A window system having a plurality of processors to be parallelly operated for displaying a plurality of windows in parallel by executed primitives requested from an application program, comprising the means of:

classifying said primitives into a plurality of groups according to characteristics of said primitives;

obtaining at least a frequency of occurrence of at least a primitive belonging to at least one of the classified groups, said frequency being in correspondence with one of said classified groups; and determining a number of processors in said plurality of processors, for executing at least a primitive to be processed after obtaining said at least a frequency, according to said frequency of occurrence;

wherein said means for classifying, said means for obtaining the frequency of occurrence, and said means for determining are executed after the primitives are displayed in said windows requested by said application program.

10. A method of processing a graphics system having a plurality of processors to be operated in parallel, comprising the steps of:

classifying a series of graphics output primitives created by an application program into a plurality of groups according to characteristics thereof;

obtaining at least a frequency of occurrence of at least a graphics output primitive belonging to at least one of the classified groups, said frequency being in correspondence with the one of said classified groups; and determining a number of processors in said plurality of processors, for executing at least a graphics output primitive to be processed after obtaining said at least a frequency; according to said frequency of occurrence.

11. The method of processing a graphics system having parallel processors according to claim 10, wherein said step of classification classifies graphics output primitives into a first group of graphics output primitives which can be executed in parallel among said plurality of processors and a second group of graphics output primitives which cannot be executed in parallel among said plurality of processors.

12. The method of processing a graphics system having parallel processors according to claim 10, wherein said step of obtaining obtains at least a frequency of occurrence of at least a graphics output primitive when the graphic output primitives are transferred to a request buffer at time to be processed sequentially; and said step of determining determines said number of processors to be allotted to execution of the graphics output primitives to be transferred to said request buffer at a next time at the point of time when the execution of the transferred graphics output primitives ends.

13. The method of processing a graphics output system having parallel processors according to claim 10, wherein said step of determining determines said number of processors to be allotted to execution of the remaining graphics output primitives among a series of graphics output primitives created by said application program, at the point of time when graphics output primitives of an expected number among said series of graphics output primitives end.

14. A method of processing a graphics system having a plurality of processors to be operated in parallel, comprising the steps of:

classifying a series of graphics output primitives created by an application program, into a first group of graphics output primitives which can be executed in parallel among said plurality of processors and a second group of graphics output primitives which cannot be executed in parallel among said plurality of processors;

obtaining at least a frequency of occurrence of at least a graphics output primitive which is classified as said second group of graphics output primitives;

obtaining a frequency of continuous occurrences of said at least a graphics output primitive classified as said second group of graphics output primitives; and determining a number of processors in said plurality of processors, for executing at least a graphics output primitive to be processed after obtaining said frequency of occurrence and said frequency of continuous occurrences, according to said frequency of occurrence and said frequency of continuous occurrences.

15. A method for allotting parallel processing tasks to processors of a multiprocessor system for improved graphics display, comprising steps of:

classifying a plurality of graphics output primitives of an application program into segregated groups based on predetermined characteristics thereof;

determining a frequency of occurrence of a one of the graphics output primitives of the plurality; and allotting a number of said processors for executing the one of the graphics output primitives based on said determining.

* * * * *